(No Model.)
S. R. PERCY & W. S. WELLS.
BREWING.
No. 254,565. Patented Mar. 7, 1882.
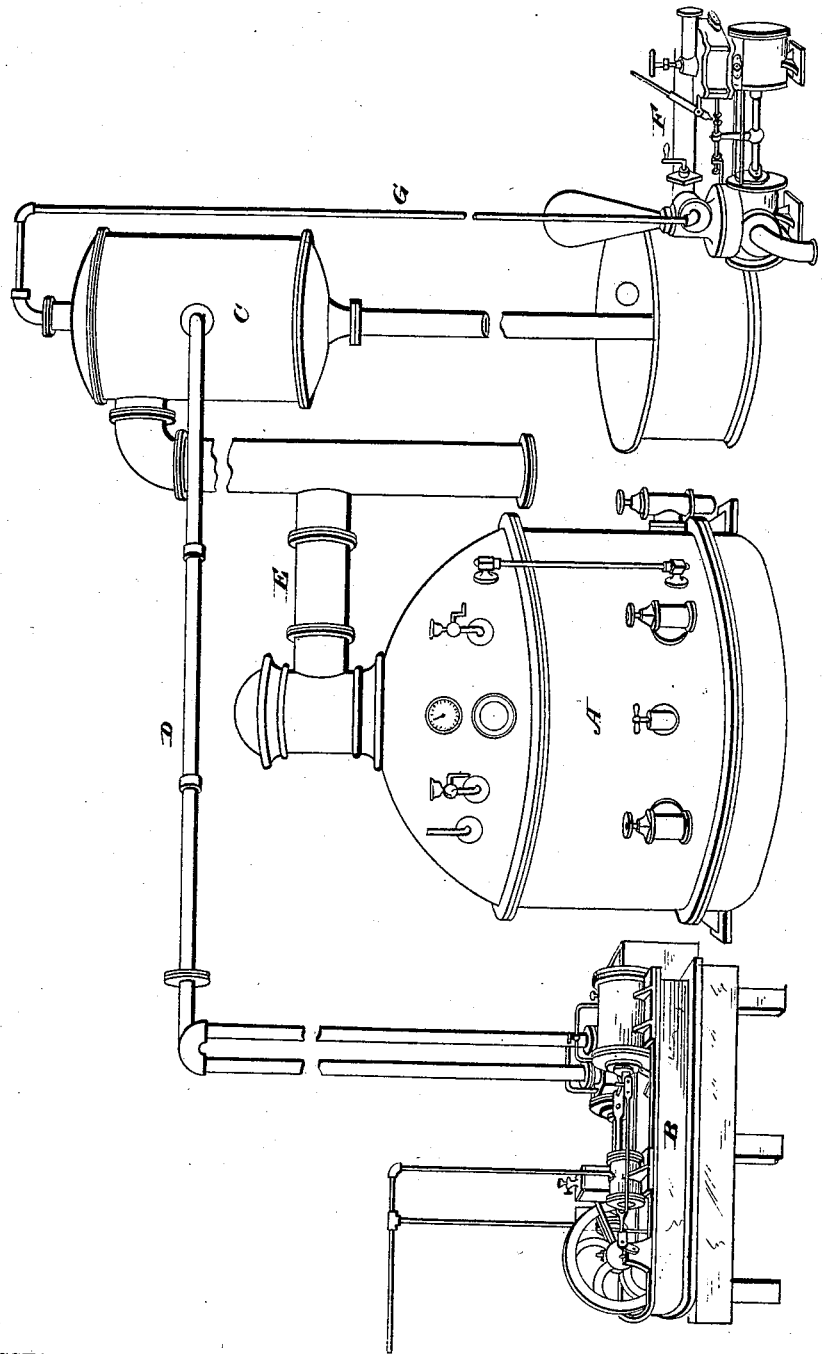
WITNESSES
INVENTORS
S. R. Percy and W. S. Wells
by Liggett and Liggett
ATTORNEYS

UNITED STATES PATENT OFFICE.

SAMUEL R. PERCY AND WALTER S. WELLS, OF NEW YORK, N. Y.

BREWING.

SPECIFICATION forming part of Letters Patent No. 254,565, dated March 7, 1882.

Application filed July 18, 1881. (No model.)

*To all whom it may concern:*

Be it known that we, SAMUEL R. PERCY and WALTER S. WELLS, citizens of the United States, residing in the city, county, and State of New York, have discovered an Improvement in Process of Preparing a Combined Extract of Hops and Malt; and we do hereby declare the following to be a full, clear, and exact description of the invention, such as will enable others skilled in the art to which it pertains to make and use it, reference being had to the accompanying drawing, which forms a part of this specification.

The object of our invention is to produce a combined extract of hops and malt in which the essential principles of both substances shall be so concentrated as to be more easy of manipulation, less bulky in storage, and capable of indefinite preservation in their original purity and strength.

With these objects in view our invention consists in digesting hops and malt with certain solvents, to be hereinafter named.

The accompanying drawing represents part of the apparatus used in the prosecution of our process.

Our invention precludes certain deteriorations to which hops and malt as ordinarily delivered to the market are liable. Hops exposed to the air lose by evaporation their volatile and ethereal oils, which contain their valuable aromatic elements, and not only suffer by the oxidation of their lupuline and resinous constituents, but also become tainted in flavor by the absorption of gases, noxious odors, and moisture, and, if baled, often heated and decomposed. Malt is liable to destruction by fungoid growths, induced by dampness, to cryptogamous degeneration, and to alterations of its dextrine and diastase by atmospheric action. Again, both hops and malt, unless preserved in sealed packages, are subject to destruction by the ravages of minute animal life.

Our invention, which contemplates the digestion of hops and malt with certain solvents, obviates all necessity of boiling them according to the practice in vogue, which entails considerable expense, and which is attended with the escape of many of the valuable properties of the hops. The degree of heat to which the hops and malt are subjected during the process of digestion is only sufficient to insure liquefaction, solution, and condensation to destroy foreign germs and to neutralize and eliminate elements detrimental to fermentation. The solvents employed and depended upon to extract the essential elements of the hops and malt consist of glycerine, alcohol of the amyle or methyl variety and of an alkali, the three substances being used in the proportion of one gallon each of glycerine and alcohol and one pound of alkali to every one hundred pounds of combined hops and malt, the best good of the solvents being doubtless obtained by dissolving them in water, which is introduced into the digester containing hops and malt.

The proportions above given need not necessarily be adhered to, as it must be apparent that variations in the strength and quality of the solvents, and also of the hops and malt themselves, will require different combinations to produce the most satifactory results; neither need all the solvents be used at once, for the glycerine may be employed alone or combined with either of the other solvents, in which instances the proportions may be varied from those first given.

It may also be said that while many different alkalies may be used with good results, bicarbonate of soda admirably meets the requirements of the alkaline element of the solvents.

It is also proper to remark that by the use of glycerine alone hops may be exhausted of all their lupuline, resin, and oil. It also operates to neutralize the valerianic and lupamaric acids which the hops contain, and which interfere with the action of the diastase and interrupt fermentation, and further neutralizes the lactic acid generated in malt. It dissolves the tannin element in the hops and holds it in suspension until its union is effected with the albuminoid constituents in the mash, whereupon precipitation occurs, called "clearing" or "fining" of the liquor, and any excess of glycerine which may have been used becomes converted into glycerole by the action of diastase, and becomes gradually converted into malt, wine, or spirits of hops and malt.

Having above set forth some of the advantageous results obtained by our invention, and having stated the chemical action of glycerine upon the hops and malt, we will now proceed to describe one form of apparatus, which may be employed in carrying out the invention.

The main features of the apparatus are three in number, and consist in a digester, a condenser and receiver, and an evaporator, to which may be added such auxiliary devices as air and water pumps, a steam-generator, and a condenser for the vapors rising from the evaporator. The first step of the process consists in introducing into the digester hops and malt and the solvent solution, the said digester being provided with an agitator and being connected with exhausting apparatus and a steam-generator. After the elements have been put into the digester as above, it is hermetically closed, the air-pump is actuated to create a vacuum within it, steam is admitted into it, and the agitator is actuated for a sufficient length of time to thoroughly mingle its contents. The digestion which results from the combined disintergrating and dissolving action of the steam and solvents extracts from the hops and malt their essential constituents, which are held in suspension in the steam and in solution in the solvent's fluid. As soon as the steam and fluid are charged to saturation they are drawn off into a condenser and receiver in which a vacuum is maintained and in which the steam is condensed. The digester is filled and refilled with steam and with the solvent-fluid, and drawn off, as before described, until the hops and malt are perfectly exhausted, when a second supply of them is introduced into the digester, and the operation repeated. In order to concentrate the extract as thus obtained and to preclude destructive chemical action, it is drawn from the receiver and condenser into an evaporator, (designated by the letter A in the accompanying drawings.) In this vessel the extract is mingled with molasses or its equivalent, substantially in the proportion of one gallon thereof to one hundred pounds of hops and malt, the exact amount of saccharine matter required by the extract to bring it to the consistency of sirup depending largely upon the amount of saccharine matter present in the malt.

Among the saccharine substances which may be substituted for molasses, glucose and honey may be mentioned; but any others may be employed.

A constant vacuum is maintained in the evaporator A by means of an air-pump, B, connected with a condenser, C, by pipe D. The said condenser C, into which the vapor from the evaporator rises, being connected with the evaporator by pipe E. A pump, F, forces water through a pipe, G, to the head of the condenser C. The evaporator should be provided with heating apparatus, with a thermometer for determining its temperature, with a gage for determining the perfection of the vacuum within it, and with means for testing and withdrawing its contents. The digester and the receiver and condenser are not shown in the drawings. When the process of evaporation has been carried to such an extent that the commingled contents of the pan are reduced to the consistency of sirup, the said sirup is drawn into kegs, cases, or other packages adapted to be hermetically sealed. These packages are now labeled with directions for use, and are ready for the market.

It is intended in the prosecution of our process that from the time the hops and malt and solvents are placed in the digester and the saccharine matter is introduced into the evaporating-pans a vacuum shall be maintained throughout the whole apparatus until the sirup is drawn into the packages and prepared for sale. By sustaining the vacuum in this manner the escape of any of the volatile elements in the hops is prevented. If, however, the sirup should be exposed after the process of condensation and evaporation with saccharine matter has been completed, it will suffer no injury, inasmuch as the volatile, resinous, and other soluble elements of the hops, and the phosphatic, maltose, diastasic, and dextrose principles of the malt have then become so blended with the glycerine and other solvents and saccharine matter that neither evaporation or oxidation can occur, the whole forming one homogeneous fluid of sirupy consistence.

We are aware that it is not new to employ alkalies and alcohol, either separately or together, in the preparation of extracts of hops and malt.

We are also aware that hops and malt have been before digested with steam and evaporated *in vacuo*, and that extracts of hops and malt have before been reduced to the consistency of sirup with saccharine substances.

It is apparent that hops and malt may, if desired, be separately carried through the above-described process, and that the resulting extract of each can be mingled by the brewer at the time of using.

We would have it understood that we do not limit ourselves to the exact succession of steps and proportions of elements described, but consider ourselves at liberty to make such slight variations and alterations as fairly fall within the spirit and scope of our invention.

Having fully described our invention, what we claim as new, and desire to secure by Letters Patent, is—

1. A process of preparing a combined extract of hops and malt, consisting in digesting them with glycerine, substantially as described.

2. A process of preparing a combined extract of hops and malt, consisting in digesting them with glycerine and alcohol, as described.

3. A process of preparing a combined extract of hops and malt, consisting in digesting them with glycerine, alcohol, and an alkali, as described.

4. A process of preparing a combined extract of hops and malt, consisting in digesting them with glycerine and alcohol, substantially in the proportions of one gallon each of glycerine and alcohol to one hundred pounds of combined hops and malt.

5. A process of preparing a combined extract of hops and malt, consisting in digesting them with glycerine, alcohol, and an alkali, substantially in the proportion of one gallon each of glycerine and alcohol and one pound of alkali to one hundred pounds of combined hops and malt.

6. A process of preparing a combined extract of hops and malt, consisting in digesting them with alcohol and glycerine, the alcohol and glycerine being used in the proportion of one gallon each of glycerine and alcohol to one hundred pounds of combined hops and malt, and in evaporating the products of digestion with a saccharine substance in the proportion of one gallon, or its weight equivalent thereof, to one hundred pounds of combined hops and malt, substantially as set forth.

7. A process of preparing a combined extract of hops and malt, consisting in digesting them with alcohol, glycerine, and an alkali, the alcohol, glycerine, and alkali being used in the proportions of one gallon each of glycerine and alcohol and one pound of alkali to one hundred pounds of combined hops and malt, and in evaporating the products of digestion with a saccharine substance in the proportion of one gallon, or the weight equivalent thereof, to one hundred pounds of hops and malt, substantially as set forth.

SAM. R. PERCY.
WALTER S. WELLS.

Witnesses:
L. J. HARVEY,
W. C. MOORE.